(12) United States Patent
Smith et al.

(10) Patent No.: US 11,008,495 B1
(45) Date of Patent: May 18, 2021

(54) METHODS AND SYSTEMS TO RAPIDLY HYDRATE DRY POLYACRYLAMIDES POLYMERS IN A CHEMICAL DELIVERY MATRIX

(71) Applicant: HIGHLAND FLUID TECHNOLOGY, Houston, TX (US)

(72) Inventors: Kevin Wilbur Smith, Bellaire, TX (US); Jason Kenneth Holt, Ball Ground, GA (US)

(73) Assignee: HIGHLAND FLUID TECHNOLOGY INC., Houston, TX (US)

( * ) Notice: Subject to any disclaimer, the term of this patent is extended or adjusted under 35 U.S.C. 154(b) by 0 days.

(21) Appl. No.: 16/662,361

(22) Filed: Oct. 24, 2019

(51) Int. Cl.
| | |
|---|---|
| *C09K 8/035* | (2006.01) |
| *C08L 33/26* | (2006.01) |
| *C08L 71/02* | (2006.01) |
| *C08J 3/12* | (2006.01) |

(52) U.S. Cl.
CPC .............. *C09K 8/035* (2013.01); *C08J 3/124* (2013.01); *C08L 33/26* (2013.01); *C08L 71/02* (2013.01); *C09K 2208/28* (2013.01)

(58) Field of Classification Search
CPC .................................. C09K 8/035; C08J 3/124
USPC ........................................................ 166/308.2
See application file for complete search history.

(56) References Cited

U.S. PATENT DOCUMENTS

| | | | | |
|---|---|---|---|---|
| 9,644,139 B2* | 5/2017 | Mahoney | ................. | C09K 8/62 |
| 2014/0051610 A1* | 2/2014 | Perry | ..................... | C09K 8/845 |
| | | | | 507/226 |
| 2016/0369068 A1* | 12/2016 | Reilly, Jr. | ............. | C02F 11/145 |

\* cited by examiner

*Primary Examiner* — William D Hutton, Jr.
*Assistant Examiner* — Ashish K Varma
(74) *Attorney, Agent, or Firm* — Pierson Intellectual Property LLC

(57) ABSTRACT

A composition comprising a water-soluble powder that is agglomerated by a water-soluble wax, which is then allowed to cool and re-solidify to product clusters of the water-soluble powder.

7 Claims, 1 Drawing Sheet

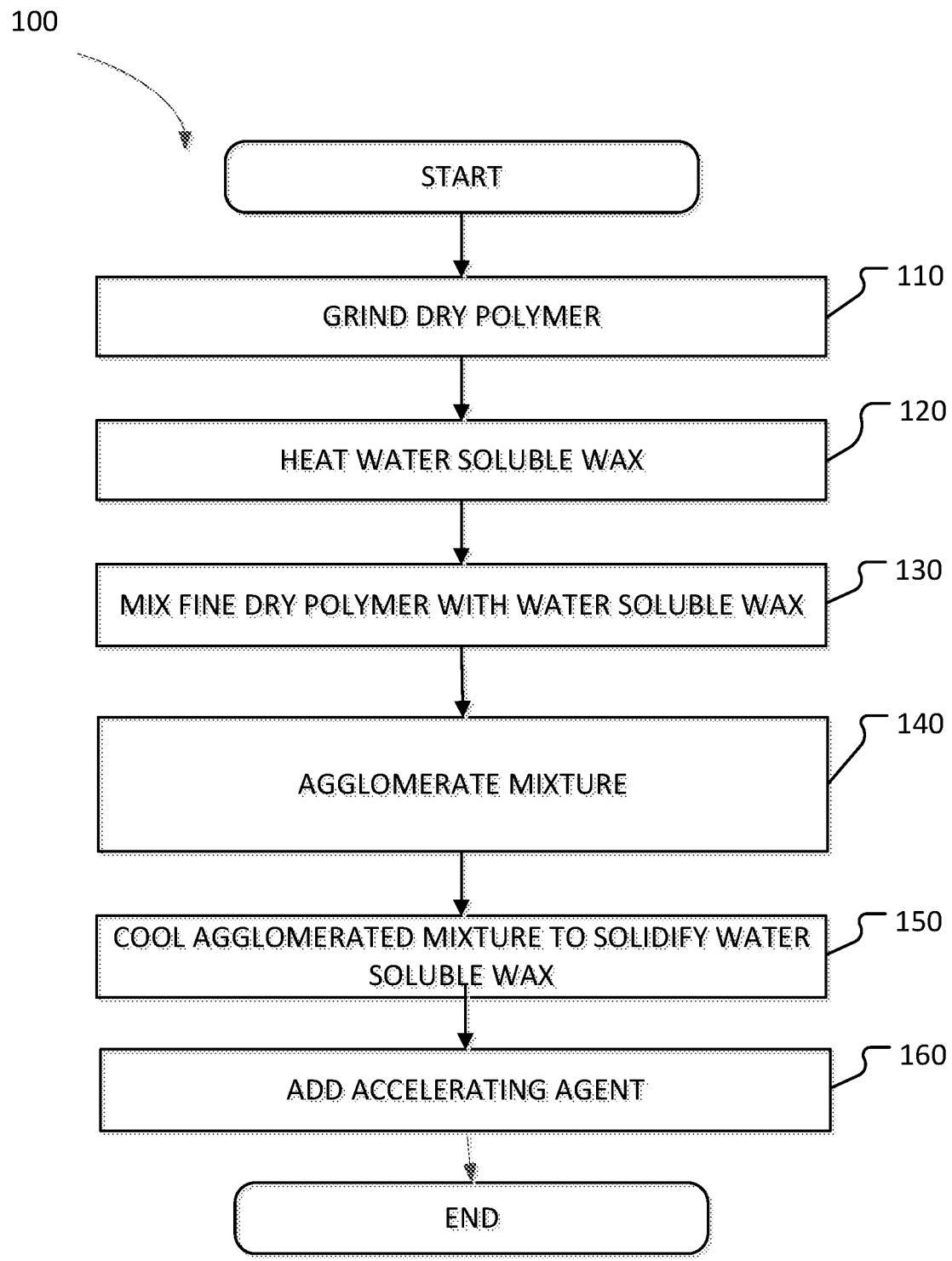

METHODS AND SYSTEMS TO RAPIDLY HYDRATE DRY POLYACRYLAMIDES POLYMERS IN A CHEMICAL DELIVERY MATRIX

BACKGROUND INFORMATION

Field of the Disclosure

Examples of the present disclosure relate to systems and methods for reducing friction in the fracturing process. More specifically, embodiments are directed towards a composition comprising a water-soluble dry powder that is agglomerated by a water-soluble wax, which is then allowed to cool and re-solidify to product clusters, prills, flakes, etc. of the mixture.

Background

In the drilling, completion, and stimulation of oil and gas wells, well treatment fluids are often pumped into well bore holes at high rate and high pressure to propagate a crack in the formation rock in a process known as fracturing. As the fluid is pumped downhole through pipes at the high flow rates there is a significant amount of frictional resistance between the fluid and the pipes, which results in large energy requirements. It is critical to reduce the friction between the fluid and the pipes to limit the energy requirements. To reduce friction, a friction reducing polymer that can decrease friction up to 80% in the pipe, which makes the process more efficient.

Conventionally, water soluble polymers have been used as friction reducers in well treatment fluids to alter their properties, thereby preventing energy loss as the fluid is pumped through the pipe. Due to the high rates of pumping the fluid through the pipes, it is required that the water-soluble polymers be hydrated very quickly. Inverting surfactants are added to emulsion PAM to release the polymer within 15 to 30 sec. Typically, the rate of dissolution of dry water-soluble polymers is directly correlated with the amount of surface area of the water soluble polymers that can interact with or are exposed to the fluid. As such, conventionally the water-soluble polymers are ground to very small particles. However, this can lead to the formation of "fish eyes" in the mix water that cannot be resolved, and a substantial amount of dust, which can hydrate through humidity and cause handling problems. Dust and very fine particles can lead to less than desirable results. "Fish eyes" are a mass of dry polymer coated with hydrated polymer. The water cannot get past the outer hydrated polymer coating and the dry powder in the center of the mass is wasted.

Accordingly, needs exist for systems and methods to efficiently and effectively form friction reducers configured to be utilized during well treatment by agglomerating water-soluble polymers with a water-soluble wax to increase the size of prill, wherein a surfactant is embedded within the prill to increase dispersion and dissolution.

SUMMARY

Embodiments of a polyacrylamide (PAM) or natural polymer delivery system include dry, slurries, and emulsions. Emulsions PAM dominate FR usage because of ease of handling. The polyacrylamide is polymerized in an old external emulsion that contains approximately 20 to 40% PAM, 20-40% water, and 20-40% oil. The polymer is already partially hydrated in the emulsified water phase. Surfactants are added to the emulsion such that it will invert and release the PAM when mixed in water. PAM emulsions are easily pumped, easily mixed, but only contain 20 to 40% PAM by weight. Conversely a dry PAM can be 90 to 100% active by weight. There are savings in logistics, storage, etc. and dry PAM is used in many applications, but not where rapid hydration is needed.

Conventionally, a Dry PAM is typically in the form of a powder with particles that are 500 microns to 1 millimeter. However, it takes time for the polymer to dissolve and hydrate in water. Although smaller particles dissolve and hydrate much faster and dry PAM can be ground into particles that are 25 to 300 microns, grinding of to smaller particles creates a wide distribution of particle sizes and even sub-micron dust. PAM dust makes it difficult to handle ground PAM. The resultant dust when dry PAM is conventionally ground, is very hydroscopic and will "flash" hydrate even from humidity when exposed to the atmosphere. Furthermore, ground PAM does not flow as easily as unground PAM particles. Storage and feed tanks must have a higher angle of repose in the cone bottoms to ensure the ground PAM will flow out of the tank.

Equipment can be designed to mitigate handling problems, and generally handle the dust, but the equipment is complicated and generally requires pneumatic equipment to move the ground PAM and contain the dust. Alternatively, ground powder can be mixed into a non-aqueous solvent such as hydrocarbon, alcohol or glycol. The resulting slurry has the advantage of approximately 50% dry PAM by weight, but still contains 50% oil by weight. While there are saving in logistics, still 50% of the slurry is only a carrier fluid. In many applications the wrong carrier fluid can determinantal to the process. Ideally a dry PAM or natural polymer that was easy to handle, free-flowing and essentially dust free could replace emulsions and slurries with HSE and logistics savings, but without complicated feed equipment.

Embodiments disclosed herein are directed towards forming dry PAM and natural polymers used as friction reducer to be utilized during well treatment. Embodiments may include water soluble-polymers that are ground to fine particles and be agglomerated together with a water-soluble wax and a surfactant to increase the size of prill. Combining the fine water soluble-polymers together into prills improves handling, reduces the amount of dust created, improves the flow of the dry powder, and helps disperse the powder when mixed with water to prevent fisheyes. Responsive to the prill being exposed to water is improved by using a surfactant selected to disperse the fine polymer and help hydrate the finely ground PAM Alternatively, dry reactants can be included that effervesce when mixed in water. The effervescence may create a chemical reaction, releasing carbon dioxide to assist in segmenting the prill. This may assist in the speed at which the water soluble polymers hydrate.

Embodiments of a friction reducer may include a dry polymer, water-soluble wax, surfactant, and accelerant.

The dry polymer may be a dry polyacrylamide powder that is configured to be ground to fine particles to increase the exposed surface area of the dry polymer. In embodiments, at least ninety percent of the particles of the dry polymer may have a diameter of no more than 200 microns. The, finer grinds of the dry polymers may speed the hydration process and help to fully hydrate the polymer. For example, a 60-mesh grind may meet minimum acceptable standards. However, 60 mesh grind dry polymer may take more time to hydrate. Accordingly, in other embodiments, a 100-mesh or finer grind dry polymer may be used to hydrate the dry polymer both quickly and efficiently for friction reduction.

The water soluble wax may be formed of: polyethylene glycol, polypropylene glycol, polyvinyl alcohol, polyvinylpyrrolidone, a polyol EO/PO block polymer, a waxy surfactant, such as an alcohol ethoxylate, nonylphenol ethoxylate and/or a combination of water-soluble waxes. The water soluble wax may be configured to agglomerate the dry polymers into more easily handled prills, which may be rounder, or if angular, large enough to flow easily. Selecting the correct coating agglomerating agent can have efficacy downhole. For example, polyethylene glycol inhibits shale while surfactant waxes are beneficial to reduce the surface tension of the fracturing fluid. A typical surfactant used could be an alcohol ethoxylate, a nonylphenol, octyl phenol, quaternary amine, betaine, amide or other surfactant that is a wax at ambient temperatures or does not hinder the formation of a prill when the mixture is cooled. Those skilled in the art will realize the blends of the above will have different properties and potentially more benefit downhole.

The accelerant may be a surfactant, wicking agent, exothermic salt, and/or effervescent that is configured to rapidly hydrate the dry polymer and the water soluble wax.

In embodiments, the water soluble wax is heated to molten state of the water soluble wax, and the ground dry polymer may be added. Then, a temperature of the mixture may be reduced to an atmospheric temperature, which may enable the mixture to re-solidify to produce agglomerated clusters of the mixture. The agglomerated clusters may save handling and logistical costs by reducing a total volume and weight of the dry friction reducer, which is also configured to hydrate rapidity, such as within 5 to 60 seconds after being exposed to fluid.

Those skilled in the art will realize there are multiple methods of agglomerating solids including dry mixing and heating of the entire mixture by direct heat or friction. The order of addition, etc. will depend of the equipment being used to make the agglomeration.

Specific embodiments may include a composition comprising a water-soluble powder polyacrylamide or natural polymer. wherein the said polyacrylamide polymer has at least about 90% of the particles having a diameter of no more than about 200 microns. The polyacrylamide particles may then agglomerated by a water-soluble wax, preferably polyethylene glycol, with a molecular weight greater than 2000 that has been heated into a molten state and introduced into the water-soluble powder polyacrylamide. A wicking agent and/or effervescent chemistry to rapidly hydrate the finely ground powder polyacrylamide may be added to the agglomerated mixture. The said agglomerated mixture may then be cooled to a temperature that re-solidifies the polyethylene glycol to produce agglomerated clusters of said polyacrylamide.

Embodiments may include a particulate powder and an ambient temperature solid, water-soluble wax coating.

In embodiments, the particulate powder is a polymer of acrylamide, a copolymer of acrylamide, Acylamido-tertiary-butyl sulfonic acid, a polyethylene oxide polymer, or a natural polymer and is homogenously blended with the said water-soluble wax and is heated to the melting point of said water-soluble wax.

In embodiments, the particulate powder is a polyacrylamide and is blended with the said water-soluble wax that has been pre-heated into a molten state.

In embodiments, a temperature of the mixture with the molten polyacrylamide particles is reduced to solidify said water-soluble powder.

In embodiments the heated mixture results in particle agglomeration upon cooling of said combined powder In embodiments, the water-soluble wax coating constitutes less than 50% by weight In embodiments, the water-soluble wax coating constitutes less than 25% by weight In embodiments, the water-soluble wax coating is varied based on weight to control the release of the friction reducer.

In embodiments, the polyacrylamide is anionic, nonionic, cationic, a mixture, mixture with polyethylene oxide, granular powder, blend of cationic, anionic or nonionic.

In embodiments, the water-soluble coating is polyethylene glycol polymers and an ester of the same, polypropylene glycol, polyvinyl alcohol, a surfactant that is a solid at ambient temperature, but melts at 150° F. or greater temperature, has an average number of repeating oxyethylene units greater than 30, has an average number of repeating oxyethylene units of between 75 and 185, has an average number of repeating oxyethylene units of between 30 and 74

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following FIGURES, wherein like reference numerals refer to like parts throughout the various views unless otherwise specified.

FIG. 1 depicts a method of making a dry friction reducer, according to an embodiment.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the FIGURES may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

In embodiments, an ultra-fine dry polyacrylamide friction reducer may be created to reduce friction in a casing. Utilizing a dry polyacrylamide friction reducer may save handling and logistical costs by reducing a total volume and weight of the product required to reduce friction downhole. Embodiments may be beneficial when the fracturing fluid is in the tubular members, such as pipes. Embodiments may be configured to agglomerate ground polyacrylamide with a water soluble wax to build larger particles out of the finely ground polyacrylamide, which can be more easily handled and flow more efficiently within the wellbore.

Embodiments of a friction reducer may include a dry polymer, water-soluble wax, and accelerant.

The dry polymer may be a dry polyacrylamide powder that is ground into fine particles to increase the exposed surface area of the dry polymer. The dry polymer may be configured to hydrate very quickly while being pumped downhole or immediately before being pumped downhole. For example, the dry polymer may be required to be hydrated within fifteen to sixty seconds after being exposed to fluid. This may require the dry polymer to be ground to very fine particles, wherein at least ninety percent of the particles of the dry polymer may have a diameter of no more than 150-200 microns. However, when the fine dry polymer is isolated from other products may cause fisheyes, dust, and/or allow the dry polymer to hydrate with humidity.

The water-soluble wax may be configured to agglomerate the fine dry polymer into more easily handled prills. The water soluble wax may be formed of: polyethylene glycol, polypropylene glycol, polyvinyl alcohol, a polyol EO/PO block polymer, a waxy surfactant, such as an alcohol ethoxylate, nonylphenol ethoxylate and/or a combination of water-soluble waxes. In embodiments, the wax may be configured to be melted, fed into a mixer or blender with the fine dry polymer to evenly disperse the water-soluble wax and fine dry polymer, to agglomerate the fine polymers together to form larger pills. This may create an agglomerated mixture that may be larger than 2 mm as a prill, which still hydrates quickly. Furthermore, the water-soluble wax may be configured to provide a water-soluble coating that provides a time release based on the solubility of the coating such that the dry polymers may be mixed in much higher concentrations before introducing the agglomerated mixture with fluids, and travelling downhole.

More specifically, conventionally only a single percent of dry polymer could be utilized because it is too viscous to pump once mixed. However, adding more of the water-soluble wax allows more handling time, such that ten to twenty percent of dry polymer may be utilized and pumped into the fracturing process before becoming too viscous to pump. Yet, when coating the fine dry polymer with the water-soluble wax, the agglomerated mixture may hydrate at less than desirable rates.

As such, an accelerant may be combined with the agglomerated mixture to act as a catalyst to speed up the rate of hydration of the agglomerated mixture. The accelerant may be a wicking agent, salt, citric acid and baking soda, and/or effervescent that is configured to rapidly hydrate the dry polymer and the water soluble wax when exposed to fluid. Specifically, the accelerant may be configured to release carbon dioxide when exposed to water, to assist in dispersing the fine dry polymer from the water-soluble wax within the agglomerated mixture, to break up the prill and hydrate the polymer quicker. In embodiments, the accelerant may be a wicking agent configured to interface water to the dry polymer within the agglomerated mixture quicker. The wicking agents may be mixed with water-soluble wax. There are more sophisticated wicking agents available and specifically meant to function to quickly wick water into the agglomerated prill to release the active polymer. Surfactants can also be mixed with the agglomerating wax to speed water-wetting of the polymer and to help disperse the dry polymer prills into water. Alternatively, or in addition to wicking agents, effervescent chemistry can be mixed into the dry polymer to enhance the release of the finely ground powder.

FIG. 1 depicts a method 100 for creating a dry friction reducer for use in a wellbore, according to an embodiment. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 1 and described below is not intended to be limiting.

At operation 110, a dry polymer may be grinded to create a fine dry polymer. In embodiments, the dry polymer may be grinded to approximately one hundred fifty microns.

At operation 120, a water soluble wax may be heated to a molten state. In embodiments, the water-soluble wax may melt between one hundred forty five and one hundred sixty degrees Fahrenheit.

At operation 130, the fine dry polymer and the molten, water soluble wax may be positioned within a mixer, such as a ribbon mixer. In embodiments, the molten, water-soluble wax may be inserted into the mixer. However, in other embodiments, the water soluble wax and the fine dry polymer may be mixed together within a plow mixer, and utilizing frictional heat cause the water-soluble wax to change from a solid state to a molten state within the mixer.

At operation 140, the fine dry polymer and the molten, water soluble wax may be combined together to form an agglomerated mixture. In embodiments, the percentage of the water soluble wax to fine dry polymer in volume within the agglomerated mixture may be between ten to twenty five percent.

At operation 150. The agglomerated mixture may be cooled to solidify the wax within the mixture, wherein the agglomerated mixture may be cooled to any level less than the molten state of water-soluble wax (i.e. one hundred forty five degrees Fahrenheit), such as one hundred fifteen degrees Fahrenheit.

At operation 160, an accelerating agent may be added to the cooled, agglomerated mixture. The accelerating agent may be any mechanism configured to allow the fine dry polymer within the agglomerated mixture disperse and hydrate quicker. In implementations, effervescence from the accelerating agent may form from gas generated by the reaction of an acid with a base. In most applications, effervescence that generates carbon dioxide is ideal. Sodium carbonate, potassium carbonate, etc. reacts with an inorganic dry acid such as sulfamic or an organic dry acid such as citric or tartaric acid to generate carbon dioxide and a salt. Those skilled in the art will realize you need the correct molar ratio of the base to the acid to complete the reaction and generate the most effervescence. There are also numerous combinations that will work, and different combinations maybe preferred for different applications. For example, some effervescence reactions generate oxygen that is not ideal for the fracturing process, but maybe beneficial for flocculation applications.

This may lead to a prilled friction reducer with a 70% ground polyacrylamide, 2% surfactant, and 28% polyethylene glycol 8000. Embodiments may be utilized in any application where it is desirable for effectively and efficiently handling dry polyacrylamide that hydrates quickly, such as reducing friction or water treatment.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the FIGURES provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of creating a dry friction reducer to reduce friction between fluid and pipes while the fluid is being pumped downhole, the method comprising:
   grinding a dry polymer into fine particles to increase the exposed surface area of the dry polymer, wherein at least ninety percent of the fine particles of the dry polymer have a diameter smaller than 200 microns, wherein the dry polymer is a dry polyacrylamide powder;
   agglomerating the fine particles utilizing a water-soluble wax into larger prills;
   heating the water-soluble wax into a molten state;
   after said heating, blending the heated water-soluble wax with the fine particles of the dry polymer to evenly disperse the water-soluble wax and the fine dry polymer to form the larger prills that have a diameter larger than 2 mm, wherein a percentage of the fine particles of the dry polymer of a weight of the larger prills is between 50 and 90%, and wherein a percentage of the heated water-soluble wax to fine dry polymer in volume within the agglomerated mixture is between 10 to 25%.

2. The method of claim 1, further comprising:
   cooling the mixed, heated water wax and fine particles at a temperature less than 150° F.

3. The method of claim 1, wherein the water-soluble wax is formed of at least one of polyethylene glycol, polypropylene glycol, polyvinyl alcohol, polyvinylpyrrolidone, a polyol EO/PO block polymer, a waxy surfactant, such as an alcohol ethoxylate, nonylphenol ethoxylate.

4. The method of claim 1, further comprising:
   adding an accelerant to the larger prills.

5. The method of claim 4, further comprising:
   releasing carbon dioxide via the accelerant when exposed to water to assist in dispersing the fine particles of the dry polymers from the water-soluble wax, wherein the larger prills are hydrated within fifteen seconds after being exposed to fluid.

6. The method of claim 4, wherein the accelerant is a surfactant, a wicking agent, or an effervescent.

7. The method of claim 4, further comprising:
   adding the accelerant to a molten mixture of the water-soluble wax and the fine particles of the dry polymers.

* * * * *